US012594729B2

(12) United States Patent
Kato et al.

(10) Patent No.: US 12,594,729 B2
(45) Date of Patent: Apr. 7, 2026

(54) ADHESIVE APPLICATION DEVICE AND METHOD OF APPLYING ADHESIVE

(71) Applicant: TOYOTA BOSHOKU KABUSHIKI KAISHA, Aichi-ken (JP)

(72) Inventors: Yuji Kato, Tianjin (CN); Kazunori Taguchi, Pudong New Area (CN); Xuyang Fang, Pudong New Area (CN); Yoshiki Itakura, Toyota (JP); Tadayoshi Umemura, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 201 days.

(21) Appl. No.: 18/198,993

(22) Filed: May 18, 2023

(65) Prior Publication Data

US 2023/0382057 A1    Nov. 30, 2023

(30) Foreign Application Priority Data

May 30, 2022    (CN) .......................... 202210601535.9

(51) Int. Cl.
B29C 65/52        (2006.01)
B29C 65/48        (2006.01)
(Continued)

(52) U.S. Cl.
CPC ........ B29C 65/526 (2013.01); B29C 65/4855 (2013.01); B29C 2035/1616 (2013.01);
(Continued)

(58) Field of Classification Search
None
See application file for complete search history.

(56) References Cited

U.S. PATENT DOCUMENTS 4,098,095 A * 7/1978 Roth ....................... F25C 1/142
                                                           425/363
5,804,256 A * 9/1998 Schafer ................... G03F 7/168
                                                           427/508
(Continued)

FOREIGN PATENT DOCUMENTS

CN        105750149 A  *  7/2016
DE           2346824 A1     3/1975
(Continued)

OTHER PUBLICATIONS

Office Action in related German Application No. DE 10 2023 110 483.7, dated Aug. 31, 2024 (with translation thereof).

*Primary Examiner* — Michael P. Rodriguez
(74) *Attorney, Agent, or Firm* — Greenblum & Bernstein, P.L.C.

(57)        ABSTRACT

An adhesive application device includes a coater and an air conditioning device. The coater includes a roll and a roll temperature control device. The roll has an elongated shape having an axis and outer surface and is rotatable around the axis. The roll holds thermosetting adhesive on the outer surface and applies the thermosetting adhesive to an application surface of a sheet member with the first roll being rotated and contacted with the sheet member. The roll temperature control device is disposed adjacent to the roll and configured to lower temperature of the outer surface of the roll to control viscosity of the thermosetting adhesive held by the roll to be appropriate application viscosity that is appropriate for application to the sheet member. The air conditioning device is configured to adjust temperature and humidity of air in a space near the coater.

9 Claims, 10 Drawing Sheets

(51) Int. Cl.
  *B29C 35/16* (2006.01)
  *B29C 37/00* (2006.01)
  *B29L 31/30* (2006.01)

(52) U.S. Cl.
  CPC .. *B29C 2035/1658* (2013.01); *B29C 2037/90*
          (2013.01); *B29L 2031/3011* (2013.01)

(56)          References Cited

U.S. PATENT DOCUMENTS

| | | | |
|---|---|---|---|
| 10,118,569 B2 | 11/2018 | Grande Collado et al. | |
| 2004/0123963 A1 * | 7/2004 | Chen ..................... | B41M 3/006 |
| | | | 162/134 |
| 2015/0064441 A1 * | 3/2015 | Monolo .................. | C09J 11/06 |
| | | | 156/305 |

FOREIGN PATENT DOCUMENTS

| | | | | |
|---|---|---|---|---|
| JP | 02017960 | A | * | 1/1990 |
| JP | H02-17960 | A | | 1/1990 |
| WO | WO 96/00492 | A1 | | 1/1996 |

* cited by examiner

ADHESIVE APPLICATION DEVICE AND METHOD OF APPLYING ADHESIVE

CROSS REFERENCE TO RELATED APPLICATION

This application claims priority from Chinese Patent Application No. 202210601535.9 filed on May 30, 2022. The entire contents of the priority application are incorporated herein by reference.

TECHNICAL FIELD

The present disclosure relates to an adhesive application device and a method of applying adhesive.

BACKGROUND

A skin member on which thermosetting adhesive is applied is attached to a base member and the base member with the skin member is pressed with being heated to mold a ceiling member of a vehicle. In the process of applying the thermosetting adhesive to the skin member, the thermosetting adhesive having Brookfield viscosity from 1000 mPa·s to 2500 mPa·s measured at 25° C. is applied to the skin member with a roller. The thermosetting adhesive having Brookfield viscosity from 1000 mPa·s to 2500 mPa·s measured at 25° C. has relatively high viscosity. The thermosetting adhesive is generally heated with the roller that is heated at the temperature from 45° C. to 50° C.

The adhesive application device for applying thermosetting adhesive may temporally stop the application operation during the production. Even if the application operation stops, the roller that is contacted with the thermosetting adhesive is kept being rotated (dry mixing) to prevent the thermosetting resin from being cured. The reaction of the thermosetting adhesive with moisture in the air is accelerated due to the heat of the roller that is increased by the dry mixing and the viscosity of the thermosetting adhesive may be increased. Especially, if the production is stopped for a long time, the viscosity of the thermosetting adhesive excessively increases. Therefore, the adhesive cannot be applied stably in the adhesive applying operation after the temporal stopping of the production. The adhesive may become wastes and cleaning may be necessary for the roller.

SUMMARY

The feature of the technology disclosed herein is to provide an adhesive application device and a method of applying adhesive with which viscosity of thermosetting adhesive is less likely to be increased even with an operation being stopped.

One aspect of the technology described herein relates to an adhesive application device that includes a coater and an air conditioning device. The coater includes a first roll and a roll temperature control device. The first roll has an elongated shape having an axis and outer surface and is rotatable around the axis. The first roll holds thermosetting adhesive on the outer surface and applies the thermosetting adhesive to an application surface of a sheet member with the first roll being rotated and contacted with the sheet member. The roll temperature control device is disposed adjacent to the first roll and configured to lower temperature of the outer surface of the first roll to control viscosity of the thermosetting adhesive held by the first roll to be appropriate application viscosity that is appropriate for application to the sheet member. The air conditioning device is configured to adjust temperature and humidity of air in a space near the coater.

DETAILED DESCRIPTION

Figure 1:
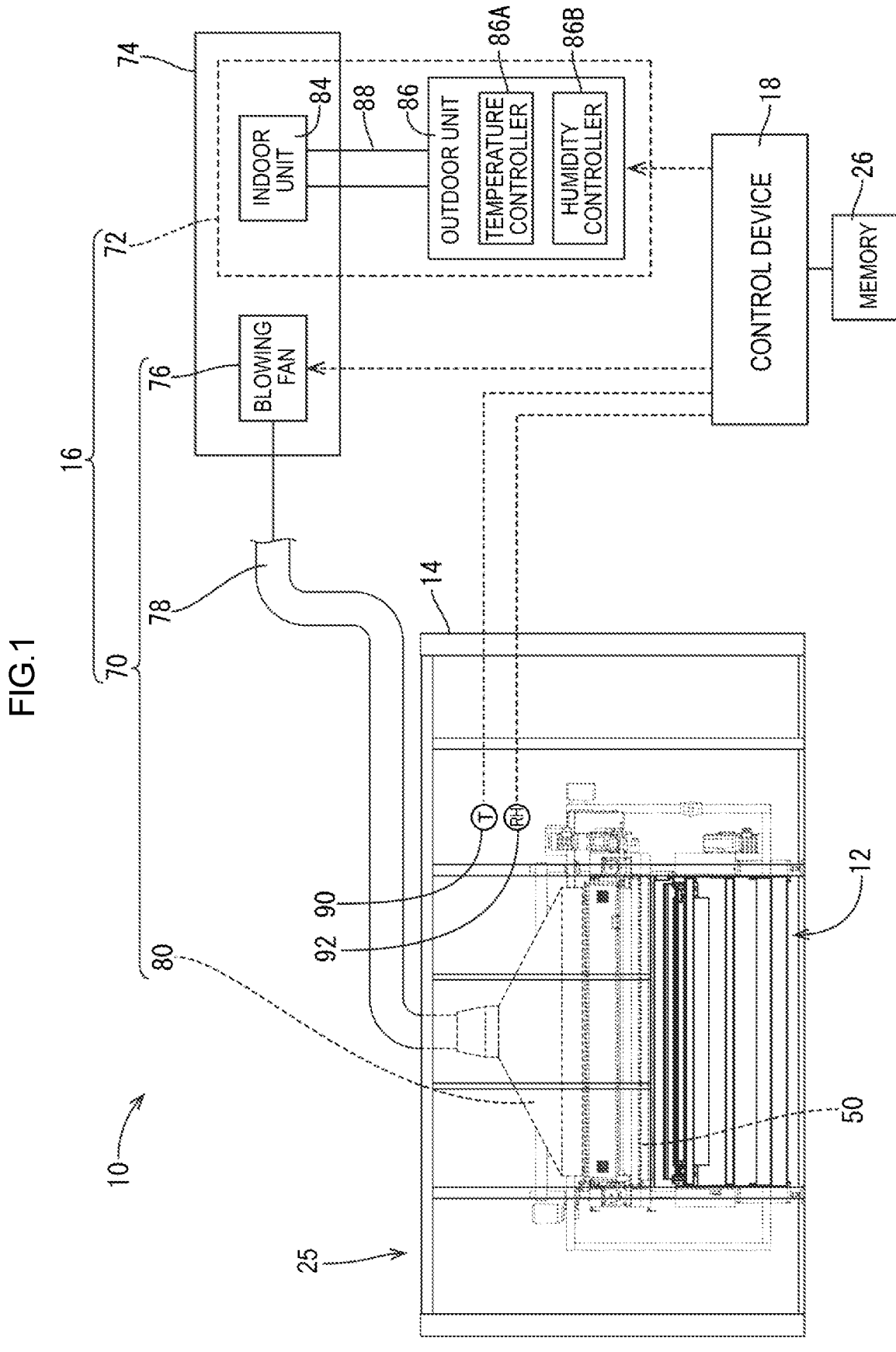
FIG. 1 is a general view illustrating an adhesive application device.

An adhesive application device 10 according to one embodiment of the present technology will be described with reference to FIGS. 1 to 10. As illustrated in FIG. 1, the adhesive application device 10 of this embodiment includes a coating device 25, an air conditioning device 16, a control device 18, and a memory 26. The coating device 25 includes a roll coater 12, an adhesive supply section 56 that is configured to supply adhesive to the roll coater 12, a temperature sensor 90 and a humidity sensor 92, which are disposed adjacent to the roll coater 12, and a housing 14 in which the roll coater 12, the adhesive supply section 56, the temperature sensor 90, and the humidity sensor 92 are arranged. The air conditioning device 16 includes an air blowing device 70 and a heat exchanger 72. The air conditioning device 16 is configured to supply air into the housing 14 from the outside and perform air conditioning of the housing 14. The memory 26 stores various data and programs that are used for the processes performed by the adhesive application device 10. The control device 18 is connected to the coating device 25, the air conditioning device 16, and the memory 26 and is configured to control the coating device 25, which includes the roll coater 12, and the air conditioning device 16 with using the data and programs stored in the memory 26. A portion of the air conditioning device 16 is illustrated with a block diagram in FIG. 1 and the components included in the block diagram may include various configurations.

The adhesive application device 10 of this embodiment is used in the process of producing a ceiling member 20 for a vehicle. The adhesive application device 10 applies diphenylmethane diisocyanate (MDI), which is thermosetting adhesive, to a skin 24 to bond the skin 24 to a base member 22 of the ceiling member 20.

Figure 2:
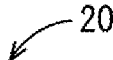
FIG. 2 is a cross-sectional view of a ceiling member that is produced by the adhesive application device.
Figure 2:
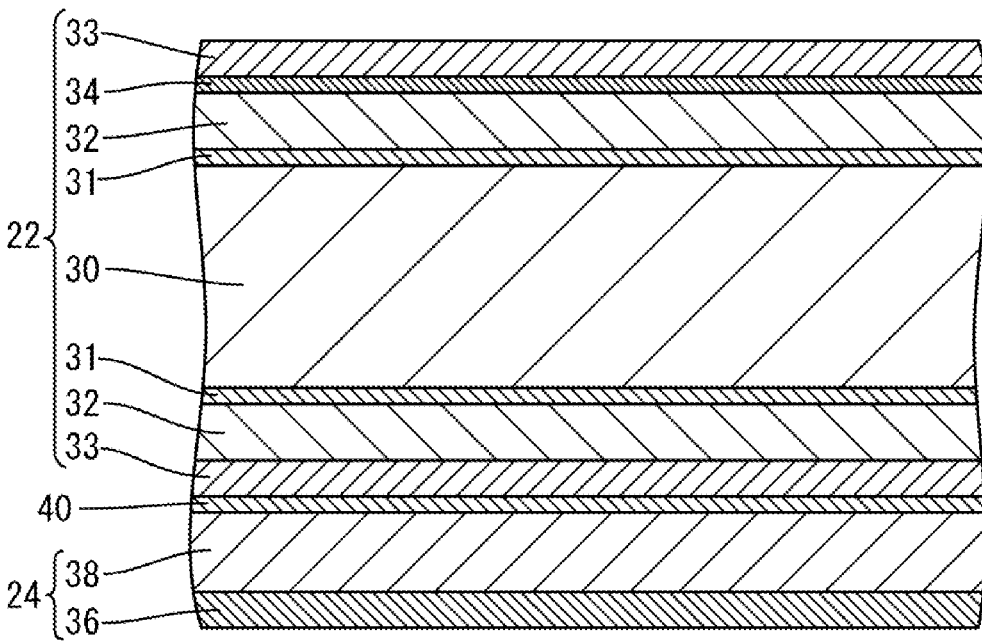

A configuration of the ceiling member 20 will be described. The ceiling member 20 includes the base member 22 and the skin 24 that is bonded to the base member 22. As illustrated in FIG. 2, the base member 22 includes a core member 30, which is made of urethane foam, adhesive layers 31, glass mat layers 32, which are made of glass fibers, and non-woven fabric layers 33. The glass mat layers 32 are disposed on two surfaces of the core member 30 via the adhesive layers 31, respectively, and the non-woven fabric layers 33 are disposed on the glass mat layers 32, respectively. The base member 22 further includes a film 34 made of polyethylene. The film 34 is disposed between the glass mat layer 32 and the non-woven fabric layer 33 that are included in a lower layer than the core member 30 (an upper side in FIG. 2). The skin 24 includes a design surface member 36 that is configured as a design surface of a ceiling and a cushion layer 38 that is made of slab urethane (urethane foam). The design surface member 36 is made of cloth. The ceiling member 20 includes the base member 22 and the skin 24 that is disposed on the base member 22 via an adhesive layer 40. The cushion layer 38 of the skin 24 and the non-woven fabric layer 33 of the base member 22 are bonded to each other with the adhesive layer 40, which is MDI. Thus, the ceiling member 20 is obtained.

Figure 3:
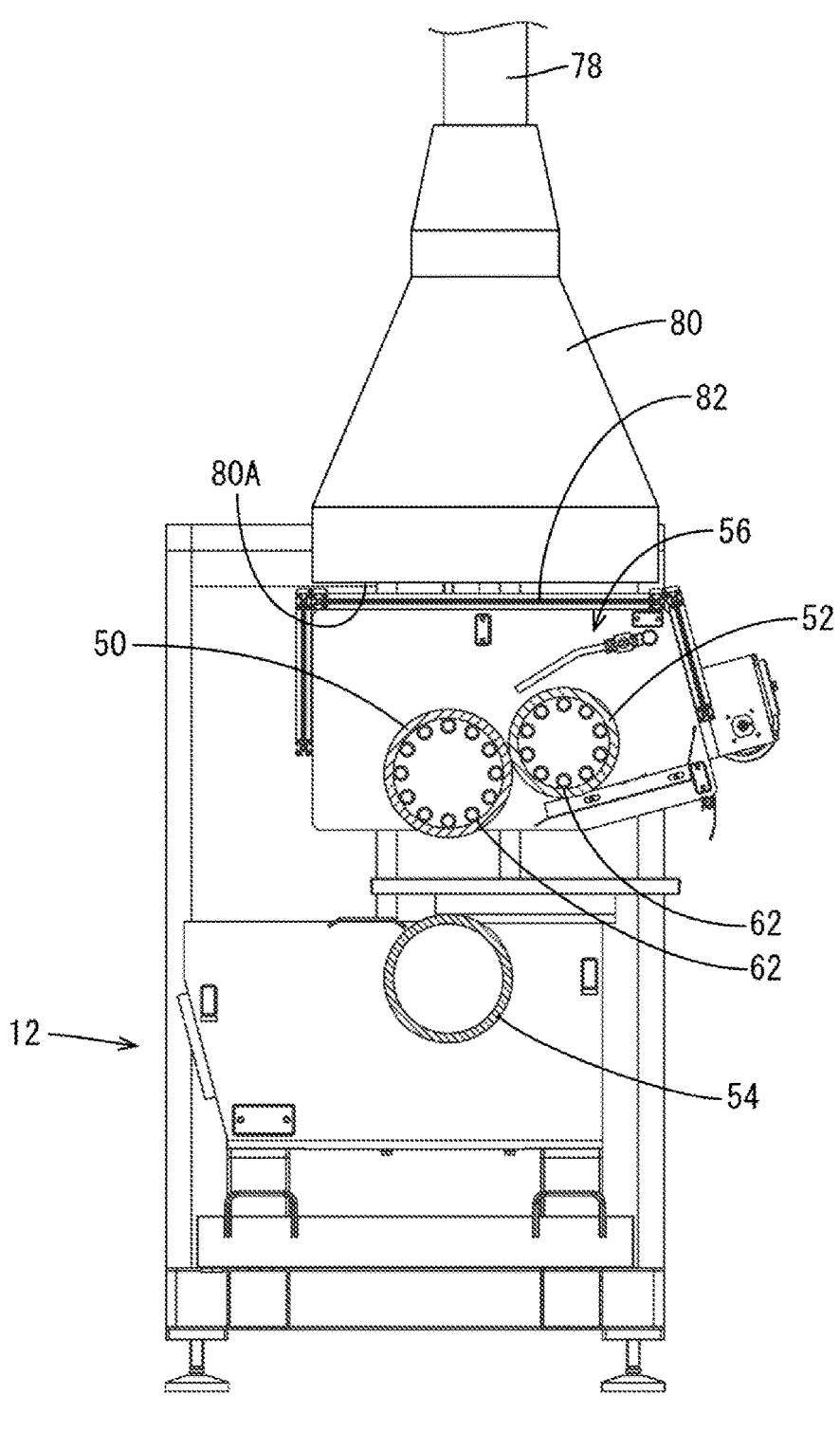
FIG. 3 is a cross-sectional view of a coater.
Figure 4:
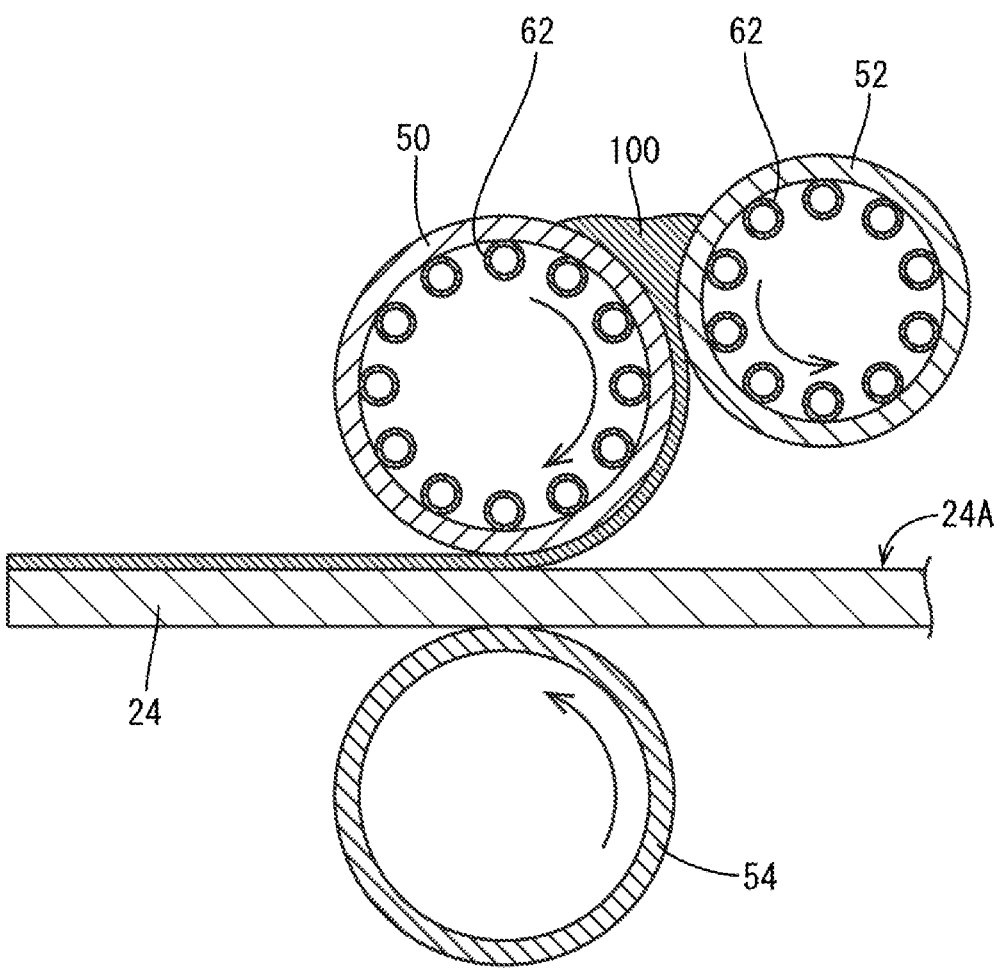
FIG. 4 is a magnified cross-sectional view illustrating a portion of FIG. 3.

The adhesive application device 10 of this embodiment is for applying MDI, which is adhesive 100, to the skin 24 that is a wide member. The adhesive application device 10 includes the coating device 25 including the roll coater 12. As illustrated in FIG. 3, the roll coater 12 includes a first roll 50, a second roll 52, and a third roll 54. The first roll 50 is a coating roll and rubber lining is performed on the outer surface of the first roll 50. The first roll 50 can hold the adhesive 100 on the outer surface and is used for application of the adhesive 100. The second roll 52 is a doctor roll (a pick up roll) that is made of steel. The first roll 50 and the second roll 52 have an elongated shape and are arranged parallel to each other. The adhesive supply section 56 is configured to supply the adhesive 100 to a space between the first roll 50 and the second roll 52 from above. As illustrated in FIG. 4, the adhesive 100 is stored in the space between the first roll 50 and the second roll 52 and is supplied with a certain amount through the space between the first roll 50 and the second roll 52.

The third roll 54 is a backup roll that is made of steel and is disposed below the first roll 50. The third roll 54 has an elongated shape and is disposed parallel to and opposite the first roll 50. The third roll 54 is movable in the upper-bottom direction by a moving up and down device. The third roll 54 presses a target object toward the first roll 50. As illustrated in FIG. 4, the skin 24, which is a target object, is disposed between the first roll 50 and the third roll 54 such that the first roll 50 is in contact with an application surface 24A (an upper surface in FIG. 4) of the skin 24 that is a surface of the cushion layer 38. With the first roll 50 being rotated in a clockwise direction around its axis and the third roll 54 being rotated in a counterclockwise direction around its axis, the adhesive 100 is applied to the application surface 24A of the skin 24 with the skin 24 being transferred. By controlling the rotational speed of the second roll 52, difference between the rotational speed of the first roll 50 and the rotational speed of the second roll 52 is controlled to control the application amount of the adhesive. In this embodiment, the difference between the rotational speeds of the first roll 50 and the second roll 52 is controlled such that the application amount of the adhesive 100, which is MDI, on the skin 24 is from 15 g/m² to 25 g/m².

The first roll 50 and the second roll 52 include water circulating type temperature controllers (a roll temperature control device), respectively. In this embodiment, the first roll 50 and the second roll 52 include pipes 62 therein as the temperature controller. The pipes 62 extend along an axial direction of each of the first roll 50 and the second roll 52 with meandering. The pipes 62 are disposed on an inner surface of the first roll 50 and the second roll 52. The pipes 62 are arranged in a circumferential direction of the first roll 50 and the second roll 52. By supplying water having adjusted temperature into the pipes 62 and with the water flowing through the pipes 62, the temperature of the outer surfaces of the first roll 50 and the second roll 52 can be controlled.

In the roll coater 12, the first roll 50 and the second roll 52 are continuously rotated to mix the supplied adhesive even with the application operation being not performed. The water flowing through the pipes 62, which are the temperature controller, adjusts the temperature of surfaces of the first roll 50 and the second roll 52 that are rotated to mix the adhesive. Therefore, the viscosity of the adhesive can be adjusted even with the application operation being not performed. The temperatures of the surfaces of the first roll 50 and the second roll 52 are detected by sensors and transferred to the control device 18. The control device 18 is configured to control the temperature controller (the temperature of water flowing through the pipes 62) and adjust the temperatures of the surfaces of the first roll 50 and the second roll 52 such that the viscosity of the adhesive become appropriate application viscosity.

In applying MDI to the skin 24, if the viscosity of MDI is smaller than 350 mPa·s, MDI that is applied to the cushion layer 38 oozes out the cushion layer 38 and permeate the design surface member 36. If the viscosity of MDI is greater than 450 mPa·s, the first roll 50 catches the skin 24 and the skin 24 is not released from the first roll 50 after the application of the adhesive and wrapped around the first roll 50. In applying the adhesive, which is MDI, to the skin 24, which is a porous sheet, the viscosity of the adhesive needs to be 350 mPa·s or greater and 450 mPa·s or smaller, which is appropriate application viscosity.

Figure 5:
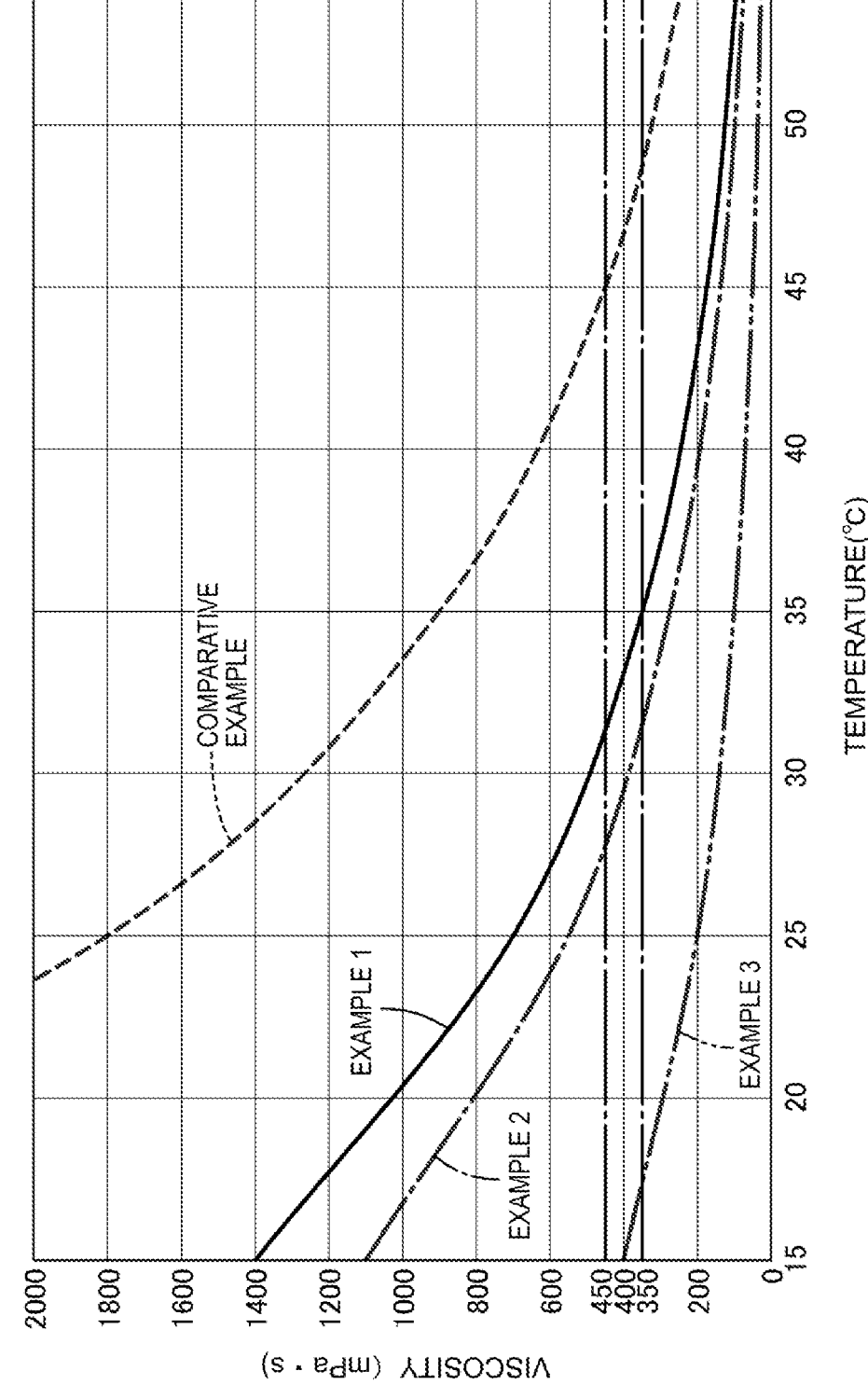
FIG. 5 is a graph illustrating characteristics of thermosetting adhesives according to Examples and Comparative Example.

In the roll coater 12, when using MDI having great viscosity of Comparative Example in FIG. 5, the temperature of the MDI needs to be increased to be any value from 45° C. to 55° C. so as to adjust the viscosity to the above range (from 350 mPa·s to 450 mPa·s, inclusive). The viscosity of the MDI of Comparative Example is 1000 mPa·s or greater at 25° C. Namely, the temperature of the first roll 50 and the second roll 52 needs to be increased to the temperature in the range from 45° C. to 55° C. As described before, in the roll coater 12, even with the application being stopped temporally, the first roll 50 and the second roll 52 are kept rotated and the adhesive is kept being mixed (dry mixing). If the application is stopped and dry mixing continues for a long time, the reaction of MDI with moisture in the air is accelerated by the heat of the first roll 50 and the viscosity of MDI may increase. If the viscosity of MDI excessively increases, the adhesive cannot be applied stably and the adhesive may become wastes and the cleaning of the roller may be necessary.

In this embodiment, the viscosity of MDI to be applied to the skin 24 is lower than the viscosity of MDI of Comparative Example. In detail, in this embodiment, the viscosity of MDI at a normal temperature is 100 mPa·s or greater and 850 mPa·s or smaller. Specifically, three Examples 1, 2, and 3 having characteristics as described in FIG. 5 are prepared. The first adhesive according to Example 1 is MDI having the viscosity of about 700 mPa·s at the temperature of 25° C. The second adhesive according to Example 2 is MDI having the viscosity of about 550 mPa·s at the temperature of 25° C. The third adhesive according to Example 3 is MDI having the viscosity of about 200 mPa·sat the temperature of 25° C. Each of the adhesives of Examples 1 to 3 is supplied by the roll coater 12 such that the supplied adhesive has the above-described viscosity at the temperature of 25° C. However, the viscosityofthesuppliedadhesivemaybevaried-duetotheoutertemperature. Therefore, with considering the influence of the outer temperature, the first adhesive has viscosity ranging from 550 mPa·s to 850 mPa·s, the second adhesive has viscosity ranging from 350 mPa·s to 650 mPa·s, and the third adhesive has viscosity of ranging from 100 mPa·s to 370 mPa·s.

As illustrated in FIG. 5, with using the adhesives according to Examples 1 to 3 having low viscosity, the viscosity of the adhesives can be controlled to be in the range of the appropriate application viscosity from 350 mPa·s to 450 mPa·s, inclusive, in the temperature range from 15° C. to 40° C., inclusive. The viscosity ranging from 350 mPa·s to 450 mPa·s, inclusive, is appropriate for applying the adhesives to the skin 24 and is defined as the appropriate application viscosity. More in detail, with reference to FIG. 5, the viscosity of the first adhesive can be adjusted to the appropriate application viscosity by controlling the temperature to be from 30° C. to 35° C. The viscosity of the second adhesive can be adjusted to the appropriate application viscosity by controlling the temperature to be about 30° C. The viscosity of the third adhesive can be adjusted to the appropriate application viscosity by controlling the temperature to be from 15° C. to 20° C.

In this embodiment, with using MDI having the viscosity from 100 mPa·s to 850 mPa·s, inclusive, at the normal temperature, the viscosity of the applied MDI can be controlled to be from 350 mPa·s to 450 mPa·s, inclusive, which is the appropriate application viscosity, at the temperature from 15° C. to 40° C., which is about the normal temperature. Therefore, in this embodiment, the viscosity of MDI is less likely to be increased unlike MDI of Comparative Example, which has high viscosity.

Operations of controlling the viscosity of the supplied MDI to be the appropriate application viscosity with using MDI having the viscosity from 100 mPa·s to 850 mPa·s, inclusive, at the normal temperature will be described. The ambient temperature RT near the roll coater 12 may be increased due to dry mixing as described before. If the ambient temperature RT around the roll coater 12 is higher than a reference temperature CT, the temperature of each of the first roll 50 and the second roll 52 may be lowered by the temperature controller, which is pipes 62, to be lower than the ambient temperature RT to adjust the viscosity of the MDI to the application appropriate viscosity. However, this may cause condensation around the first roll 50 and the second roll 52, particularly between the first roll 50 and the second roll 52, because difference between the lowered temperature of the first roll 50 and the second roll 52 and the ambient temperature RT becomes large. The condensation is more likely to occur as the humidity increases around the roll coater 12. If the condensation occurs around the first roll 50 and the second roll 52, MDI may react with the moisture and the viscosity of MDI may be increased.

The adhesive application device 10 according to this embodiment includes the air conditioning device 16 that controls conditions of air around the roll coater 12. Ventilation is necessary when using MDI. The air conditioning device 16 is configured to perform replacement of air in the housing 14 and control temperature and humidity of air around the roll coater 12, especially, the air in a space in which the first roll 50 and the second roll 52 are disposed.

Figure 6:
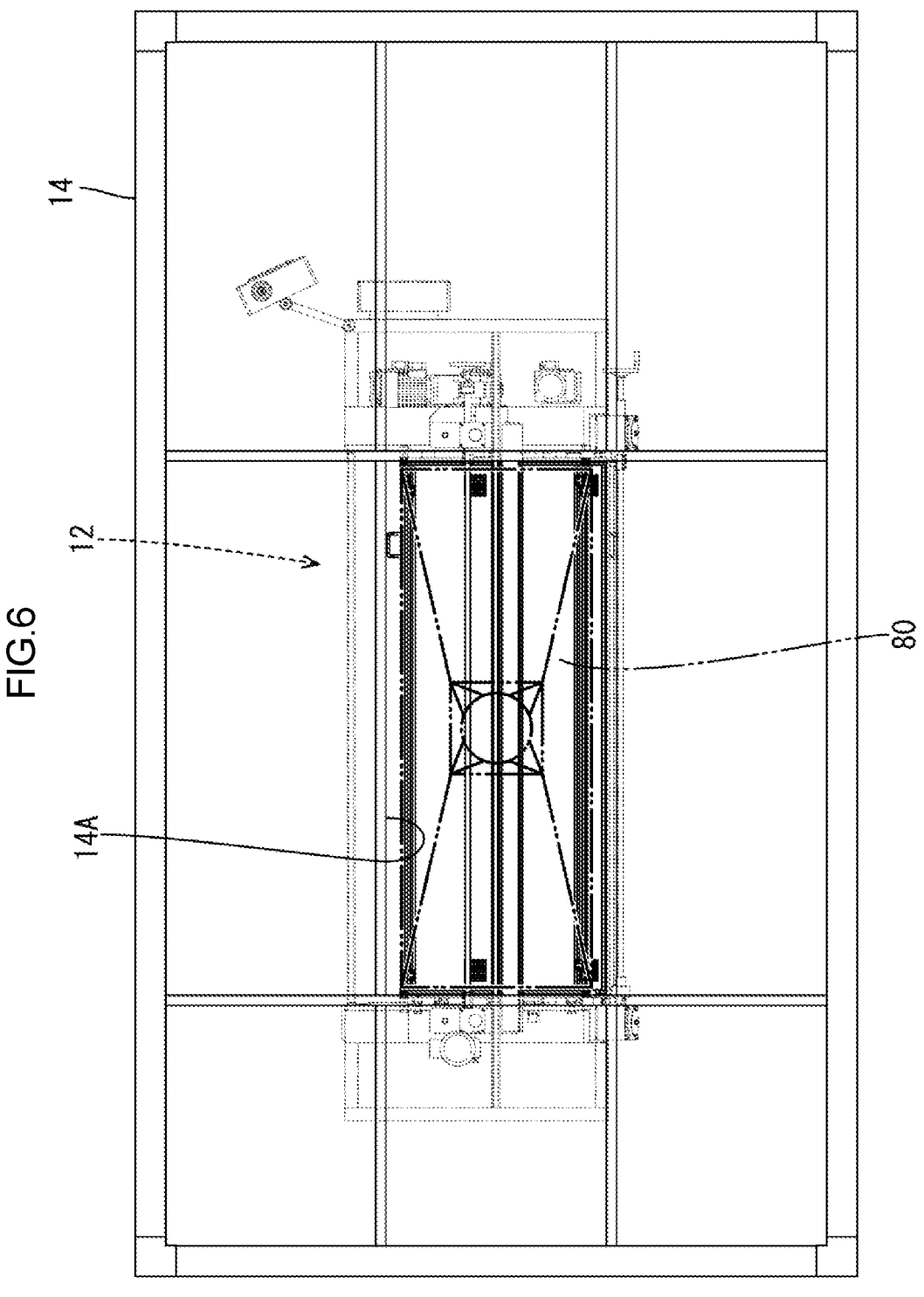
FIG. 6 is a plan view of a coating device.

The air conditioning device 16 will be described with reference to FIG. 1. The air conditioning device 16 includes the air blowing device 70 and the heat exchanger 72 that are disposed outside the housing 14. The air blowing device 70 includes a blowing fan 76, a duct 78, and an outlet portion 80. External air is sucked into a housing 74 of the air blowing device 70 and supplied to the coating device 25 via the duct 78 by the blowing fan 76. The blowing fan 76 and the indoor unit 84 are disposed in the housing 74 of the air blowing device 70. The temperature and humidity of the air inside the housing 74 is controlled by the blowing fan 76. As illustrated in FIG. 6, the housing 14 includes a discharge hole 14A in a ceiling of the housing 14. Air inside the housing 14 is discharged through the discharge hole 14A to the outside via a discharge duct. The duct 78 of the air blowing device 70 extends into the housing 14 through the discharge hole 14A. The outlet portion 80 is at the distal end of the duct 78 and is disposed above the roll coater 12. The air that is supplied through the duct 78 is blown into the housing 14 through the outlet portion 80.

Figure 7:
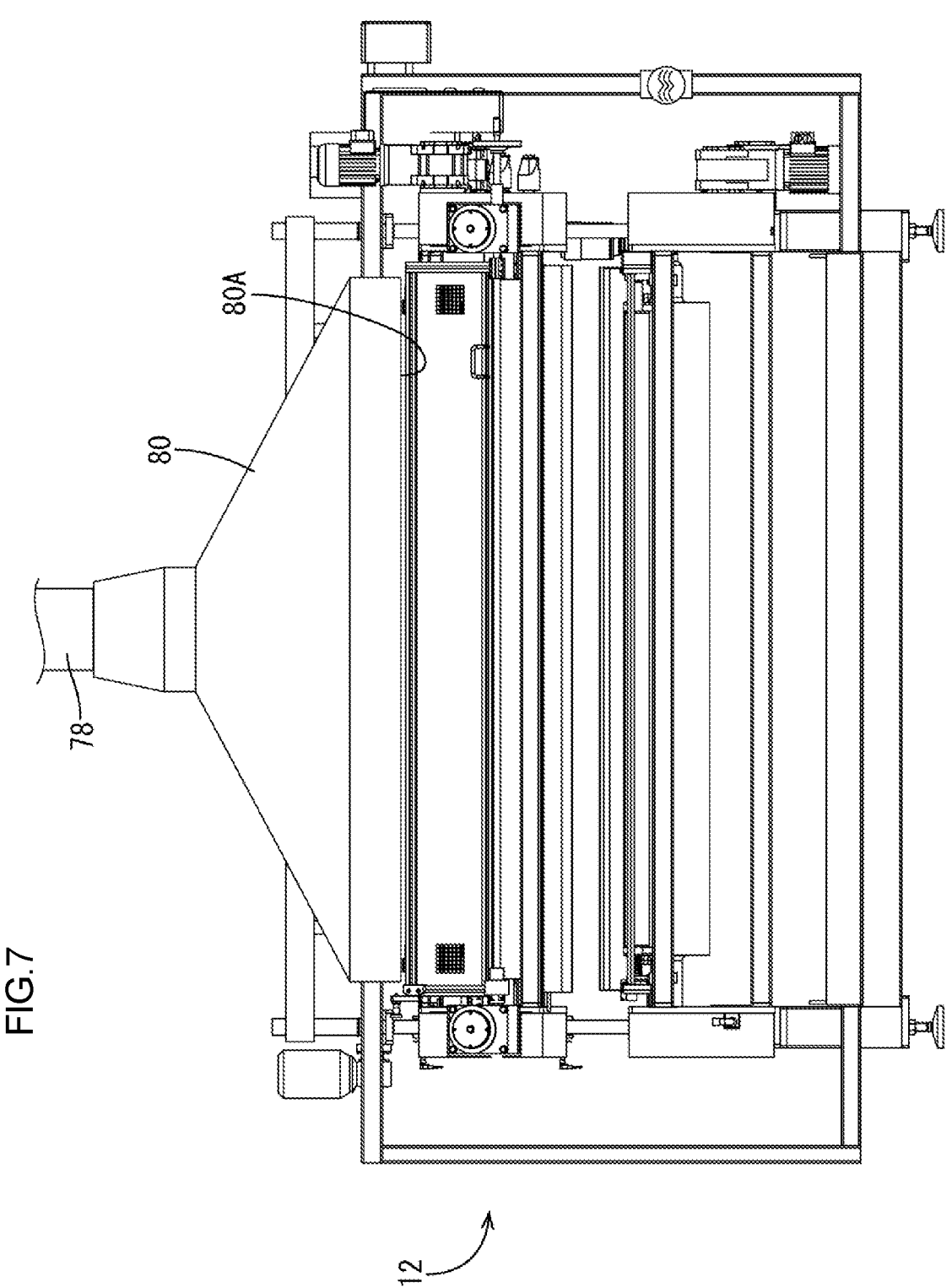
FIG. 7 is a front view of the coater.
Figure 8:
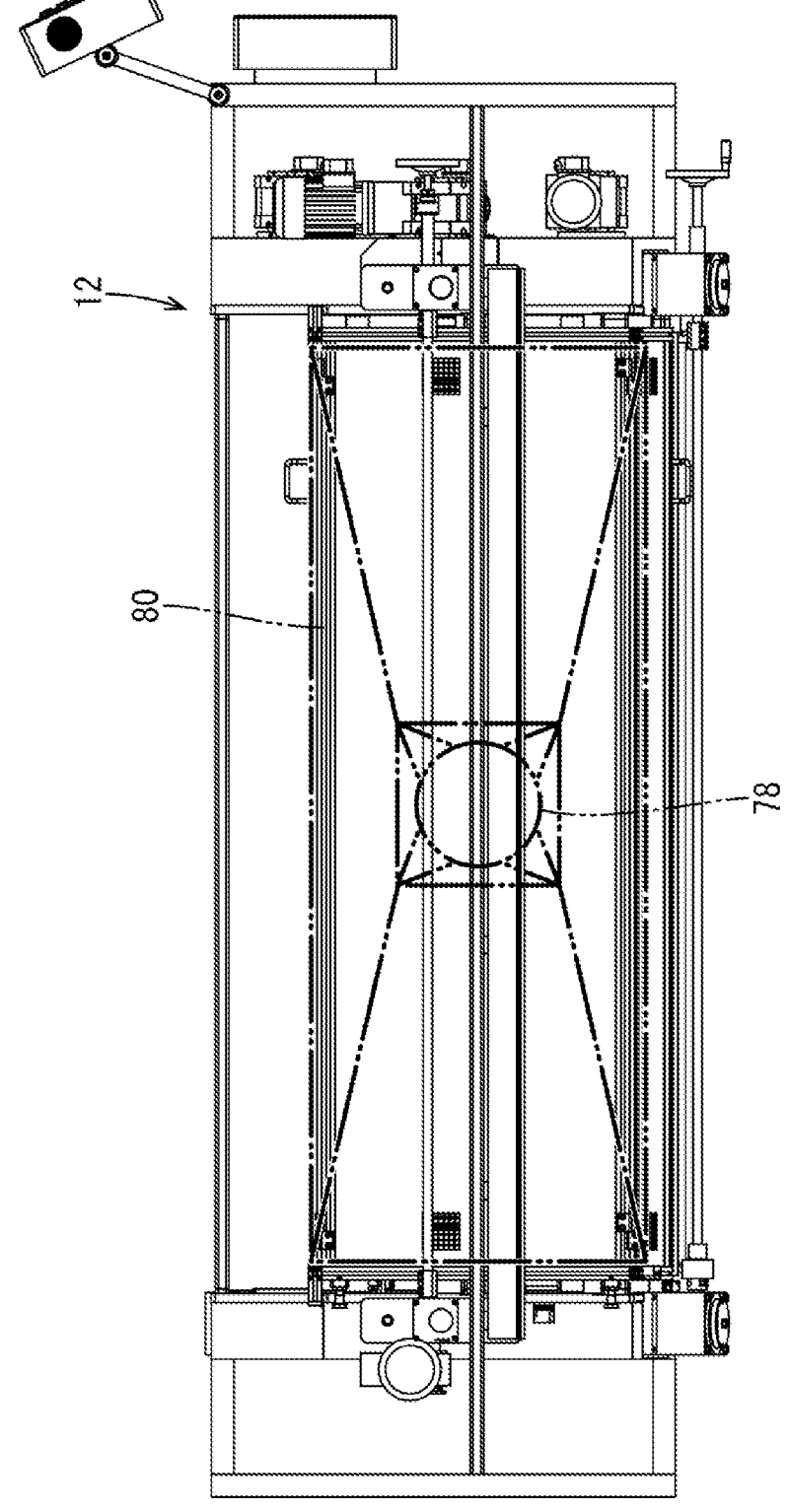
FIG. 8 is a plan view of the coater seen from above.

As illustrated in FIGS. 7 and 8, the outlet portion 80 has an outlet surface 80A that is opposite the first roll 50 and the second roll 52. The outlet surface 80A has an elongated shape extending parallel to the first roll 50 and the second roll 52. As illustrated in FIG. 3, the first roll 50 and the second roll 52 of the roll coater 12 are covered with a cover 82 of a mesh. The outlet portion 80 is disposed such that the outlet surface 80A is opposite the cover 82. The outlet portion 80 includes a rectifier therein and includes holes in the outlet surface 80A. By changing and adjusting the number of the holes or a size of the holes, air is blown out at a same amount and a same speed from any portions of the outlet surface 80A with respect to an elongated direction of the outlet surface 80A. The air is blown out from the outlet portion 80 at the amount from 1600 m³/h to 2300 m³/h and at the speed from 1 m/s to 1.5 m/s.

The temperature and the humidity of the air to be blown out by the air blowing device 70 are controlled by the heat exchanger 72. As illustrated in FIG. 1, the heat exchanger 72 includes an indoor unit 84, an outdoor unit 86, and refrigerant pipes 88. The indoor unit 84 is disposed in the housing 74 of the air blowing device 70. The outdoor unit 86 is disposed outside the housing 74 of the air blowing device 70. The refrigerant pipes 88 connect the indoor unit 84 and the outdoor unit 86. The outdoor unit 86 includes a temperature controller 86A and a humidity controller 86B. The heat exchanger 72 is configured to control temperature and humidity of the air that is blown into the housing 74 of the air blowing device 70 by the blowing fan 76.

Figure 9:
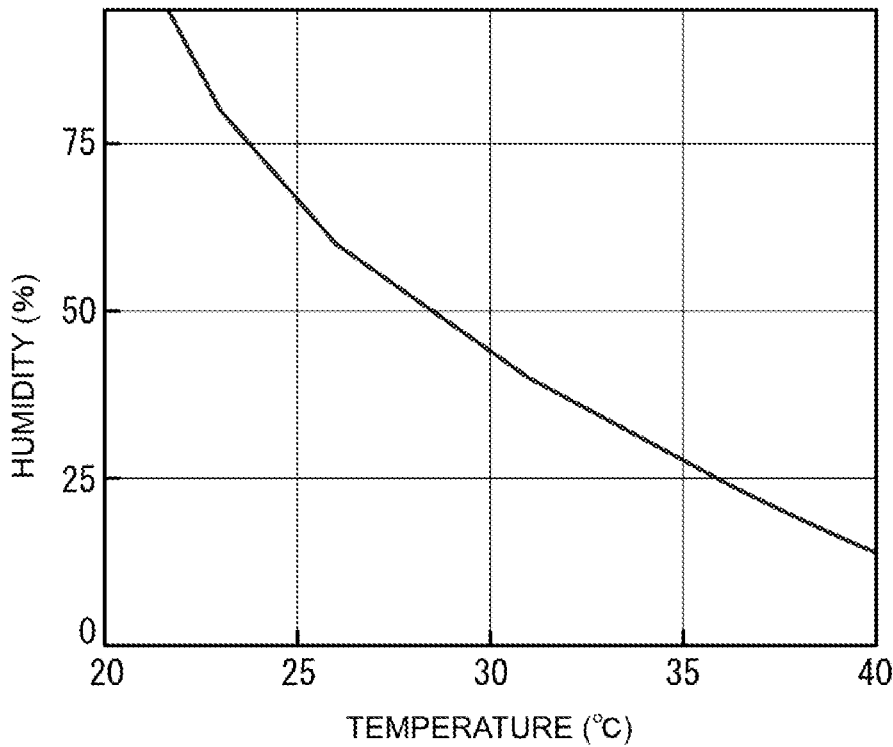
FIG. 9 is a graph representing relations of temperature and humidity.

The air conditioning device 16 having the above configuration adjusts the temperature and humidity of air to be supplied according to the temperature of the first roll 50 and the second roll 52 and supplies the air, which has adjusted temperature and humidity, to the ambient space in which the first roll 50 and the second roll 52 are arranged. The temperature and humidity of the air that is to be supplied to the ambient space are controlled by the heat exchanger 72 so as to have relation that does not cause condensation. FIG. 9 illustrates the graph that represents a border line between conditions that cause condensation and conditions that do not cause condensation in the ambient space near the first roll 50 and the second roll 52. The position of the border line is moved according to the temperature of the first roll 50 and the second roll 52. The graph in FIG. 9 represents lowest combinations of temperature and humidity with the temperature of the first roll 50 and the second roll 52 being varied within the range from 15° C. to 40° C.

Upon receiving a command from the control device 18, the heat exchanger 72 controls the temperature and humidity so as to satisfy a condition included in the range lower than the graph in FIG. 9. Specifically, the temperature controller 86A and the humidity controller 86B of the heat exchanger 72 control the temperature and humidity of the air that is to be supplied to the coating device 25 by the blowing fan 76 such that ambient temperature RT and ambient humidity RH near the first roll 50 satisfy a condition included in the range lower than the graph in FIG. 9. If the ambient temperature RT around the first roll 50 and the second roll 52 is increased due to the dry mixing, the temperature of the first roll 50 and the second roll 52 is lowered by controlling the temperature of water flowing through the pipes 62, which are the temperature controller. Even with such a case, the air whose temperature and humidity are controlled by the air conditioning device 16 is supplied to the ambient space of the first roll 50 and the second roll 52. Therefore, the air around the first roll 50 and the second roll 52 that is supplied by the air conditioning device 16 has the temperature and humidity that does not cause condensation. In the adhesive application device 10 of this embodiment, condensation is less likely to occur near the first roll 50 and the second roll 52 and the viscosity of MDI that is supplied to a space between the first roll 50 and the second roll 52 is less likely to be increased.

The blowing fan 76 and the heat exchanger 72 are controlled by the control device 18. Control operations of the control device 18 controlling the blowing fan 76 and the heat exchanger 72 will be described. As illustrated in FIG. 1, the coating device 25 includes the temperature sensor 90 and the humidity sensor 92 adjacent to the first roll 50 and the second roll 52. The temperature sensor 90 and the humidity sensor 92 detect ambient temperature RT and ambient humidity RH, respectively, near the first roll 50 and the second roll 52. The ambient temperature RT and the ambient humidity RH detected by the temperature sensor 90 and the humidity sensor 92, respectively, are transferred to the control device 18. The control device 18 is configured to control the blowing fan 76 and the heat exchanger 72 of the air conditioning device 16 based on the detected ambient temperature RT and the detected ambient humidity RH.

The memory 26 stores a reference table including characteristics data of adhesives (MDI) such as appropriate application viscosity at a normal temperature and target values of the temperature controller (pipes 62) to be set, which are target roll temperatures of the first roll 50 and the second roll 52, for every kind of the adhesives. With reference to the reference table stored in the memory 26, the control device 18 determines the target value of the temperature controller (the target roll temperature of the first roll 50) based on the type of the adhesive (MDI) that is inputted by an operator and to be used. In this embodiment, the control device 18 determines the target roll temperature of the first roll 50 such that MDI to be used has the appropriate application viscosity. Namely, the control device 18 determines the temperature of water flowing through the pipes 62 according to the type of the adhesive (MDI) that is inputted by the operator and is to be used.

With the adhesive application device 10 being activated, the control device 18 obtains ambient temperature RT1 detected by the temperature sensor 90 and ambient humidity RH1 detected by the humidity sensor 92. The control device 18 determines target ambient temperature T0 and target ambient humidity RH0 of the roll coater 12 based on the target roll temperature of the first roll 50 and the second roll 52, and the ambient temperature RT1 detected by the temperature sensor 90 and the ambient humidity RH1 detected by the humidity sensor 92. The control device 18 determines target ambient temperature T0 and target ambient humidity RH0 such that the target ambient temperature T0 and the target ambient humidity RH0 satisfy a condition included in the range lower than the graph in FIG. 9. The target ambient temperature T0 and the target ambient humidity RH0 that are determined by the control device 18 are stored in the memory 26.

A control process of controlling the air conditioning device 16 during the adhesive application will be described with reference to a flowchart in FIG. 10. The control process of controlling the air conditioning device 16 during the adhesive application is performed by execution of an air condition control program that is illustrated with the flowchart in FIG. 10. The control process of controlling the air conditioning device 16 will be described with reference to the air condition control program. The air condition control program is performed repeatedly at predetermined short intervals during the adhesive application process as an interruption process. The air condition control program is one example and any other programs for adjusting temperature and humidity can be used.

Figure 10:
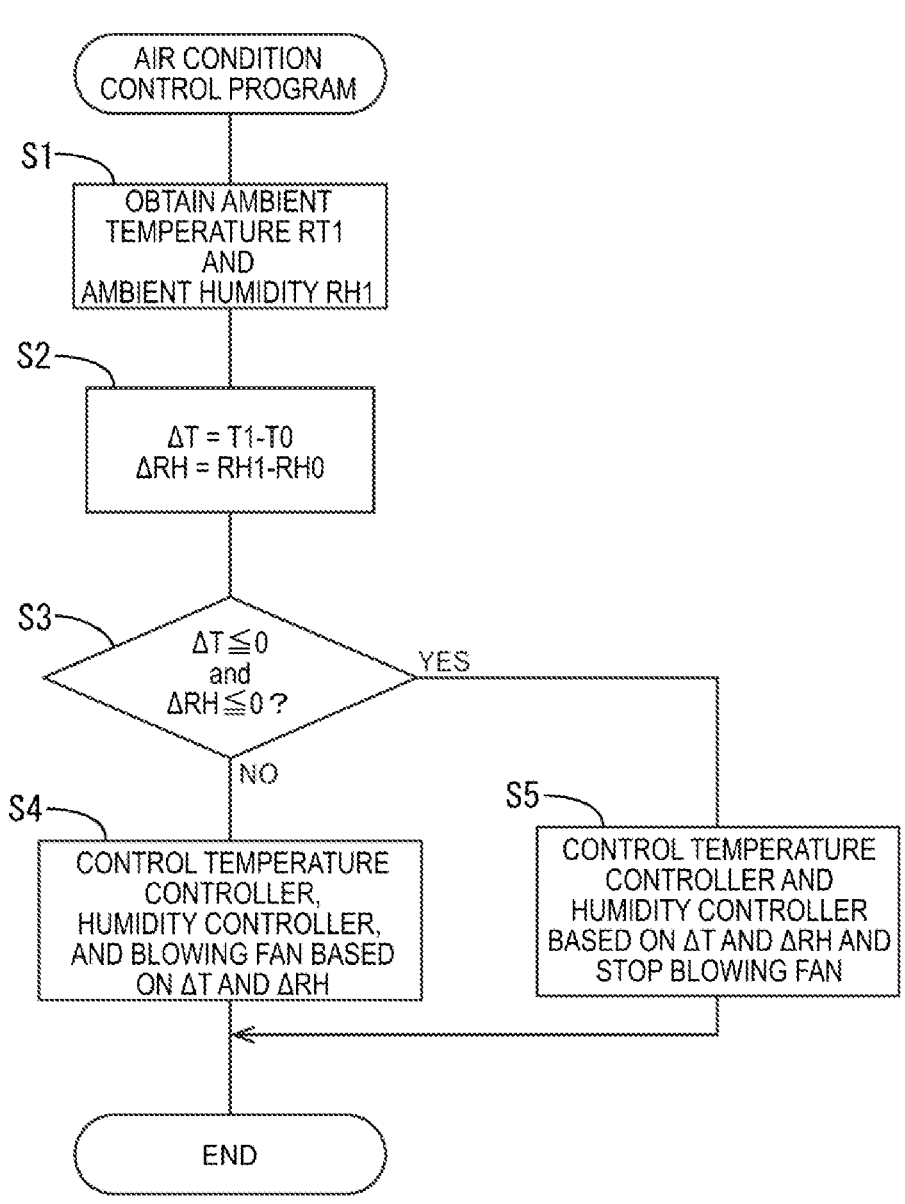
FIG. 10 is a flowchart of an air condition control program.

In the air condition control program, as illustrated in FIG. 10, the control device 18 obtains current ambient temperature RT1 detected by the temperature sensor 90 and current ambient humidity RH1 detected by the humidity sensor 92 (S1). Next, the control device 18 compares the target ambient temperature T0 and the ambient temperature RT1 that is obtained at S1 and compares the target ambient humidity RH0 and the ambient humidity RH1 that is obtained at S1. The control device 18 obtains temperature difference ΔT between the target ambient temperature T0 and the ambient temperature RT1 by subtracting the target ambient temperature T0 from the ambient temperature RT1 and obtains humidity difference ΔRH between the target ambient humidity RH0 and the ambient humidity RH1 by subtracting the target ambient humidity RH0 from the ambient humidity RH1 (S2). Next, in S3, it is determined whether condensation is likely to be caused in the ambient environment of the first roll 50 and the second roll 52. Specifically, the control device 18 determines whether the temperature difference ΔT is zero or smaller and the humidity difference ΔRH is zero or smaller (S3). Namely, if the current ambient temperature RT1 is higher than the target ambient temperature T0 or the current ambient humidity RH1 is higher than the target ambient humidity RH0, condensation is likely to occur.

If the control device 18 determines that the temperature difference ΔT is not zero or smaller and the humidity difference ΔRH is not zero or smaller (S3:NO), condensation is likely to occur. Then, the process proceeds to S4 and the control device 18 controls the temperature controller 86A and the humidity controller 86B of the outdoor unit 86 to adjust the temperature and humidity of the air, which is inside the housing 74 of the air blowing device 70 and is to be blown out by the blowing fan 76, based on the temperature difference ΔT and the humidity difference ΔRH. Then, the blowing fan 76 is activated. Accordingly, the temperature and humidity of the air inside the housing 74 of the air blowing device 70 are lowered and the air whose temperature and humidity are lowered is supplied to the roll coater 12 by the blowing fan 76. The air to be supplied to the roll coater 12 by the blowing fan 76 has temperature and humidity lower than the current ambient temperature RT and the current ambient humidity RH1, respectively.

If the control device 18 determines that the temperature difference ΔT is zero or smaller and the humidity difference ΔRH is zero or smaller (S3:YES), condensation is less likely to occur. Then, the process proceeds to S5 and the control device 18 controls the temperature controller 86A and the humidity controller 86B of the outdoor unit 86 to keep the current temperature and humidity of the air that is inside the housing 74 of the air blowing device 70 and stop the blowing fan 76. After the process of S4 or S5, the air condition control program is terminated and the process returns to the main routine of the adhesive application process.

The adhesive application device 10 of this embodiment is for applying MDI, which is thermosetting adhesive, to the application surface 24A of the skin 24, which is a porous sheet member. The adhesive application device 10 includes the roll coater 12, the temperature controller, and the air conditioning device 16. The roll coater 12 includes the first roll 50 that is rotated around its axis to be contacted with MDI that is supplied. Thus, the first roll 50 holds MDI on its outer surface. The first roll 50 is contacted with the application surface 24A of the skin 24, which is transferred, and MDI is applied to the application surface 24A. The temperature controller, which is the roll temperature controller, is configured to lower the temperature of the surface of the first roll 50 such that viscosity of MDI supplied to the roll coater 12 is adjusted to the appropriate application viscosity that is appropriate viscosity for applying MDI to the skin 24. The air conditioning device 16 is configured to adjust ambient temperature and ambient humidity around the roll coater 12.

According to the adhesive application device described herein, the temperature of the first roll that is in contact with the thermosetting adhesive can be lowered to be equal to or lower than the temperature of outer air. Even if the application operation is temporally stopped and dry mixing continues fora while, the viscosity of the thermosetting adhesive is less likely to be increased. To keep the temperature of the first roll to be equal to or lower than the temperature of outer air, the thermosetting adhesive used in the adhesive application device of the technology described herein preferably have low viscosity, for example, ranging from 100 mPa·s to 850 mPa·s, inclusive, at normal temperature. With using the thermosetting adhesive having low viscosity for a porous sheet member that includes multiple holes and spaces therein such as a non-woven fabric or urethane foam, the viscosity is necessary to be adjusted such that the applied adhesive does not ooze out the porous sheet member through an opposite surface from the application surface. Further, according to the adhesive application device described herein, the thermosetting adhesive can have viscosity that is adjusted to be appropriate for application according to the type of the sheet member by controlling the surface of the first roll. However, if temperature and humidity are high in the air near the first roll of the coater, condensation is caused by lowering the temperature of the first roll. The thermosetting adhesive reacts with moisture in the air and the viscosity may be increased. According to the adhesive application device, the temperature and humidity adjacent to the coater can be adjusted and therefore, the condensation is less likely to be caused and the viscosity of the thermosetting adhesive is less likely to be increased.

The adhesive application device described herein can be used in a configuration including the coater that may cause dry mixing with the first roll. The adhesive application device described herein can be used for thermosetting adhesive whose viscosity is higher than the above range (higher than 850 mPa·s). For example, with the thermosetting adhesive whose viscosity is higher than the above range being used and the temperature of the first roll being lowered in the atmosphere where the ambient temperature is higher than the normal outer temperature, the adhesive application device according to the technology described herein can be used. In the adhesive application device described herein, adhesive including an isocyanate group that reacts with moisture such as diphenylmethane diisocyanate (MDI) is preferably used as the thermosetting adhesive. The roll temperature control device is not particularly limited and various types of roll temperature control devices such as water-cooling type or air-cooling type may be used. The configuration of the air conditioning device is not particularly limited but the air conditioning device that can give priority for adjustment of temperature and humidity of air near the first roll where condensation is likely to be caused is preferably used.

In the above configuration, the viscosity of the thermosetting adhesive to be supplied to the coater may be 100 mPa·s or greater and 850 mPa·s or smaller.

In the adhesive application device having the above configuration, the thermosetting adhesive having low viscosity at normal temperature is used. With using the thermosetting adhesive having the above range, the viscosity of the thermosetting adhesive can be adjusted to be appropriate application viscosity (for example from 350 mPa·s to 450 mPa·s) if the air near the coater has conditions that are similar to normal external air. With the thermosetting adhesive having the appropriate application viscosity, the thermosetting adhesive is less likely to ooze out the porous sheet member and the sheet member is less likely to be wrapped around the roll. In other words, with using the thermosetting adhesive having the above range, the thermosetting adhesive can be stably applied to a sheet that can be permeated with the adhesive having viscosity lower than 350 mPa·s.

In the above configuration, the coater may include a second roll and a third roll having an elongated shape and disposed parallel to and opposite the first roll. The thermosetting adhesive may be stored in a space between the first roll and the second roll. The first roll and the second roll may supply a certain amount of the thermosetting adhesive to the application surface of the sheet member through the space between the first roll and the second roll with the first roll and the second roll being rotated. The third roll and the first roll may hold the sheet member between the first roll and the third roll and transfer the sheet member with the third roll pressing the sheet member toward the first roll.

According to the above configuration, a roll coater (direct roll coater) is configured as the coater and the roll coater includes the first roll as a coating roll, a second roll as a doctor roll, and a third roll as a backup roll. In the roll coater, the temperature of the first roll is lowered to store the thermosetting adhesive in a space between the first roll and the second roll. Due to the lowered temperature, condensation is likely to be caused between the first roll and the second roll. Therefore, the adhesive application device is preferably used for applying the thermosetting adhesive with the roll coater having such a configuration.

In the above configuration, the air conditioning device may include an air blowing device configured to send air that has adjusted temperature and adjusted humidity to a space above the first roll and the second roll.

In the above-described roll coater, condensation is likely to be caused between the first roll and the second roll. However, according to the adhesive application device including the above air conditioning device, condensation is less likely to be caused in the air in the space between the first roll and the second roll. Accordingly, the viscosity of the thermosetting adhesive is less likely to be increased.

In the above configuration, the air blowing device may include an outlet portion that has an elongated shape and is disposed parallel to and above the first roll and the second roll and is configured to send air downward at a same amount and a same speed with respect to an elongated direction of the outlet portion.

According to the above configuration, even with the first roll and the second roll having an elongated shape, air can be supplied to the space between the first roll and the second roll evenly with respect to the elongated direction. Namely, the thermosetting adhesive can be preferably applied to a sheet member having a large width.

In the above configuration, the air conditioning device may be configured to adjust the temperature and the humidity of the air in the space near the coater such that condensation is not caused.

Generally, relation between temperature and humidity is as follows. As the temperature of air increases, condensation is likely to be caused even with low humidity. With considering such relation, target temperature and target humidity can be determined based on the temperature and humidity near the coater before using the air conditioning device. According to such a configuration, condensation is less likely to be caused in the air near the coater.

In the above configuration, the sheet member may be a skin that includes a design surface member configured as a design surface and a urethane foam. The skin may have the application surface on a surface of the urethane foam and the coater may be configured to apply the thermosetting adhesive to the surface of the urethane foam.

In the above configuration, the roll temperature control device may be configured to control the temperature of the first roll to a target roll temperature within a range between 15° C. to 40° C., inclusive, such that the viscosity of the thermosetting adhesive held by the first roll is controlled to be in a range from 350 mPa·s to 450 mPa·s, inclusive.

With setting the viscosity of the thermosetting adhesive to a value from 350 mPa·s to 450 mPa·s, the thermosetting adhesive is less likely to ooze out the sheet member to the design surface and the sheet member is less likely to be wrapped around the first roll. The temperature of the first roll is controlled to be the target roll temperature within a range between 15° C. to 40° C., inclusive, such that the viscosity of the thermosetting adhesive is controlled to be in a range from 350 mPa·s to 450 mPa·s, inclusive. Therefore, the temperature of the first roll may become lower than the temperature of external air. Therefore, the adhesive application device described herein is preferably used. With the adhesive application device being configured to store the thermosetting adhesive between the first roll and the second roll, the temperature of the second roll is preferably controlled in addition to the first roll.

A method of applying adhesive according to this embodiment is for applying MDI, which is thermosetting adhesive, with using the roll coater 12. In the method, by rotating the first roll 50 of the roll coater 12 around its axis, the first roll 50 is contacted with and holds MDI on the outer surface of the first roll 50. The skin 24, which is a porous sheet member, is transferred to the roll coater 12. With the first roll 50 being contacted with the application surface 24A of the skin 24, MDI is applied to the application surface 24A. In the application of MI to the skin 24, the temperature of the surface of the first roll 50 (and the second roll 52) is lowered and ambient temperature and ambient humidity around the roll coater 12 are adjusted such that viscosity of MDI supplied to the roll coater 12 is adjusted to the appropriate application viscosity that is appropriate viscosity for applying MDI to the skin 24.

According to such a configuration, with the roll coater 12 being operated, condensation is less likely to occur at any time in the air in the space in which the first roll 50 and the second roll 52 are disposed. MDI having low viscosity is used in the adhesive application device 10 of this embodiment. Therefore, the temperature of MDI may be necessary to be lowered from the temperature at the supplied timing. In such a case, condensation may occur near the roll coater 12. However, in this embodiment, the temperature and humidity of the air near the first roll 50 (and the second roll 52) are controlled by the air conditioning device 16 and condensation is less likely to occur n ear the first roll 50 (and the second roll 52). Therefore, according to the adhesive application device 10 and the method of applying adhesive according to this embodiment, even with the interruption of the application operation and with dry mixing occurring in the roll coater 12, condensation is less likely to occur near the first roll 50 (and the second roll 52) and viscosity of MDI that is supplied is less likely to be increased.

Other Embodiments

The technology described herein is not limited to the embodiments and modifications described above with reference to the drawings. The technical scope of the present disclosure may include the following embodiments and all modifications in the scope of claim or its equivalent scope.

(1) In the above embodiment, the viscosity of the thermosetting adhesive is 100 mPa·s or greater and 850 mPa·s or smaller. However, the adhesive application device and the method of applying adhesive according to the technology described herein can be used for thermosetting adhesive whose viscosity is higher than the above range. For example, with the thermosetting adhesive whose viscosity is higher than the above range being used and the temperature of the first roll 50 (and the second roll 52) being lowered when the ambient temperature is higher than the normal outer temperature, the adhesive application device and the method of applying adhesive according to the technology described herein can be used.

(2) In the above embodiment, the thermosetting adhesive is applied to the skin 24 of the ceiling member 20. However, the adhesive application device and the method of applying adhesive according to the technology described herein can be used when applying thermosetting adhesive to a porous sheet member having multiple holes and spaces therein such as skins of vehicular interior components like a door trim and an inner panel.

(3) In the above embodiment, the coater is configured to store MDI between the first roll 50 and the second roll 52. However, the coater may include a storing section that stores supplied MDI and the first roll may be disposed to be in contact with MDI stored in the storing section. In such a configuration, the air conditioning device may be configured to adjust temperature and humidity of air in the space in which the first roll and the storing section are disposed.

The invention claimed is:
1. An adhesive application device comprising:
a coater including
a first roll that has an elongated shape having an axis and has an outer surface, the first roll being rotatable around the axis and holding thermosetting adhesive on the outer surface and applying the thermosetting adhesive to an application surface of a sheet member with the first roll being rotated and contacted with the sheet member, and a roll temperature control device disposed adjacent to the first roll and configured to lower temperature of the outer surface of the first roll to control viscosity of the thermosetting adhesive held by the first roll to be an application viscosity for application to the sheet member; and an air conditioning device configured to adjust temperature and humidity of air in a space in which the first roll is disposed.

2. The adhesive application device according to claim 1, wherein the viscosity of the thermosetting adhesive to be supplied to the coater is 100 mPa·s or greater and 850 mPa·s or smaller.

3. The adhesive application device according to claim 1, wherein the coater includes a second roll and a third roll having an elongated shape and disposed parallel to and opposite the first roll, the thermosetting adhesive is stored in a space between the first roll and the second roll, the first roll and the second roll supply the thermosetting adhesive to the application surface of the sheet member through the space between the first roll and the second roll with the first roll and the second roll being rotated, and the third roll and the first roll hold the sheet member between the first roll and the third roll and transfer the sheet member with the third roll pressing the sheet member toward the first roll.

4. The adhesive application device according to claim 3, wherein the air conditioning device includes an air blowing device configured to send air that has adjusted temperature and adjusted humidity to a space above the first roll and the second roll.

5. The adhesive application device according to claim 4, wherein the air blowing device includes an outlet portion that has an elongated shape and is disposed parallel to and above the first roll and the second roll and is configured to send air downward at a same amount and a same speed with respect to an elongated direction of the outlet portion.

6. The adhesive application device according to claim 1, wherein the air conditioning device is configured to adjust the temperature and the humidity of the air in the space in which the first roll is disposed such that condensation is not caused.

7. The adhesive application device according to claim 1, wherein the sheet member is a skin that includes a design surface member configured as a design surface and a urethane foam, the skin has the application surface on a surface of the urethane foam, and the coater is configured to apply the thermosetting adhesive to the surface of the urethane foam.

8. The adhesive application device according to claim 1, wherein the roll temperature control device is configured to control the temperature of the first roll to a target roll temperature within a range between 15° C. to 40° C., inclusive, such that the viscosity of the thermosetting adhesive held by the first roll is controlled to be in a range from 350 mPa·s to 450 mPa·s, inclusive.

9. The adhesive application device according to claim 1, wherein the roll temperature control device includes pipes that are disposed in the first roll and through which water flows, and temperature of the water flowing through the pipes is lowered to lower the temperature of the outer surface of the first roll.

\* \* \* \* \*